(12) United States Patent
Alsudairi et al.

(10) Patent No.: US 11,013,363 B1
(45) Date of Patent: May 25, 2021

(54) BEVERAGE MIXING AND DISPENSING SYSTEM

(71) Applicant: KING SAUD UNIVERSITY, Riyadh (SA)

(72) Inventors: Nora Alsudairi, Riyadh (SA); Maram Alkahtani, Riyadh (SA); Lamia Alsiddiqi, Riyadh (SA); Raghad Alsarami, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/015,240

(22) Filed: Sep. 9, 2020

(51) Int. Cl.
*A47J 31/40* (2006.01)
*A47J 31/41* (2006.01)

(52) U.S. Cl.
CPC .......... *A47J 31/405* (2013.01); *A47J 31/402* (2013.01); *A47J 31/41* (2013.01)

(58) Field of Classification Search
CPC ........ A47J 31/405; A47J 31/402; A47J 31/41; A47J 31/401; A47J 31/3623; A47J 31/56; A47J 31/36; A47J 31/46; A47J 31/60; A47J 31/469; A47J 31/525; A47J 31/52; A47J 31/5253; A47J 31/4407; A47J 31/5251; A47J 31/5255
USPC ........... 99/279, 280, 283, 285, 289 R, 302 P, 99/323.2, 486
See application file for complete search history.

(56) References Cited

U.S. PATENT DOCUMENTS

| | | |
|---|---|---|
| 4,488,664 A | 12/1984 | Cleland |
| 5,353,958 A | 10/1994 | Hawkins |
| 5,918,768 A | 7/1999 | Ford |
| 5,927,553 A | 7/1999 | Ford |
| 5,931,343 A | 8/1999 | Topar et al. |
| 5,975,357 A | 11/1999 | Topar |
| 7,048,149 B1 | 5/2006 | Lassota |
| 8,402,781 B2 | 3/2013 | Cocchi et al. |
| 10,464,026 B2 | 11/2019 | Armstrong et al. |
| 2014/0348996 A1 | 11/2014 | Fischer et al. |
| 2017/0079463 A1 | 3/2017 | Conrady et al. |
| 2020/0002148 A1 | 1/2020 | Rowland et al. |

FOREIGN PATENT DOCUMENTS

| | | |
|---|---|---|
| JP | 1027279 A | 1/1998 |
| TW | 201713254 A | 4/2017 |

OTHER PUBLICATIONS

"Imperial Auto-Thick™ System"; printed on Apr. 3, 2020 from http://www.imperialbeveragesystems.com/solutions/auto-thick/.

*Primary Examiner* — Phuong T Nguyen
(74) *Attorney, Agent, or Firm* — Nath, Goldberg & Meyer; Richard C. Litman

(57) ABSTRACT

The beverage mixing and dispensing system is a system for producing beverages having a variety of different consistencies, such as those which may be used in the evaluation and treatment of patients with swallowing disorders. The beverage mixing and dispensing system automatically mixes a thickening agent in desired quantities with either water and/or an infused beverage. The beverage mixing and dispensing system may further automatically add beverage modifying agents, such as flavor additives and/or dyes. The resultant mixed beverages are automatically dispensed.

15 Claims, 6 Drawing Sheets

BEVERAGE MIXING AND DISPENSING SYSTEM

BACKGROUND

1. Field

The disclosure of the present patent application relates to beverage preparation, and particularly, to a system for mixing and dispensing beverages having differing consistencies and other qualities.

2. Description of the Related Art

For patients with speech and swallowing disorders, liquids with particular consistencies (or ranges of consistencies) may cause the patient to choke. As such, it is common to prepare beverages for the patients having a wide variety of different consistencies to determine the best diet (i.e., best consistencies and amounts) for the patient's particular condition. Typically, once consistencies of interest are determined, an intervention procedure is performed following the testing, often in the form of a Modified Barium Swallow Study (MBSS) or Fibrotic Endoscopic Examination of Swallowing (FEES) using different colored liquids and/or dyes added to liquids of differing consistency.

During the evaluation process, the speech and swallowing pathologist must be very precise in the preparation of the beverages of differing consistency, both for accuracy in the testing and to prevent accidental aspiration of the liquid by the patient, which can lead to serious conditions, such as aspiration pneumonia. Given both the precision required to prepare the testing beverages, as well as the large amount of time involved, it would be desirable to be able to automate the process. Thus, a beverage mixing and dispensing system solving the aforementioned problems is desired.

SUMMARY

The beverage mixing and dispensing system is a system for producing beverages having a variety of different consistencies, such as those which may be used in the evaluation and treatment of patients with swallowing disorders. The beverage mixing and dispensing system includes a housing having a base and a hollow upper portion. The base is adapted for receiving at least one beverage receiving container, such as a cup or the like, and the hollow upper portion includes opposed top and bottom walls and opposed front and rear walls. First, second and third receptacles are mounted within the hollow upper portion of the housing, with the first receptacle being adapted for receiving a thickening agent, such as pre-gelatinized starch or ThickenUp® produced by Societe des Produits Nestle of Switzerland, the second receptacle being adapted for receiving water, and the third receptacle being adapted for receiving at least one beverage modifying agent, such as a dye, flavoring agent, medical barium dye or the like.

The beverage mixing and dispensing system further includes an infusion chamber for receiving a beverage making agent, such as those provided in commercial beverage pods or capsules, to be infused with a portion of the water from the second receptacle to form an infusion. A plurality of receiving chambers receive a portion of the thickening agent from the first receptacle and a liquid, where the liquid is user selectable between a portion of the water from the second receptacle and a portion of the infusion from the infusion chamber; i.e., the thickening agent may be mixed with either pure water or with flavored water from the infusion chamber.

A first nozzle assembly is in communication with the plurality of receiving chambers and the third receptacle for receiving the portion of the thickening agent and the liquid from a selected one of the receiving chambers, and for further selectively receiving a portion of the at least one beverage modifying agent from the third receptacle. The first nozzle assembly includes both a mixer and a dispenser for mixing the thickening agent, the liquid and, selectively, the at least one beverage modifying agent, producing a mixed beverage having desired properties, including thickness and overall consistency. The first nozzle assembly also selectively dispenses the mixed beverage into the at least one beverage receiving container.

An ice maker may also be provided, in communication with the second receptacle for receiving a portion of the water therefrom to selectively make ice water. A second nozzle assembly receives the ice water and selectively dispenses the ice water into the at least one beverage receiving container.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
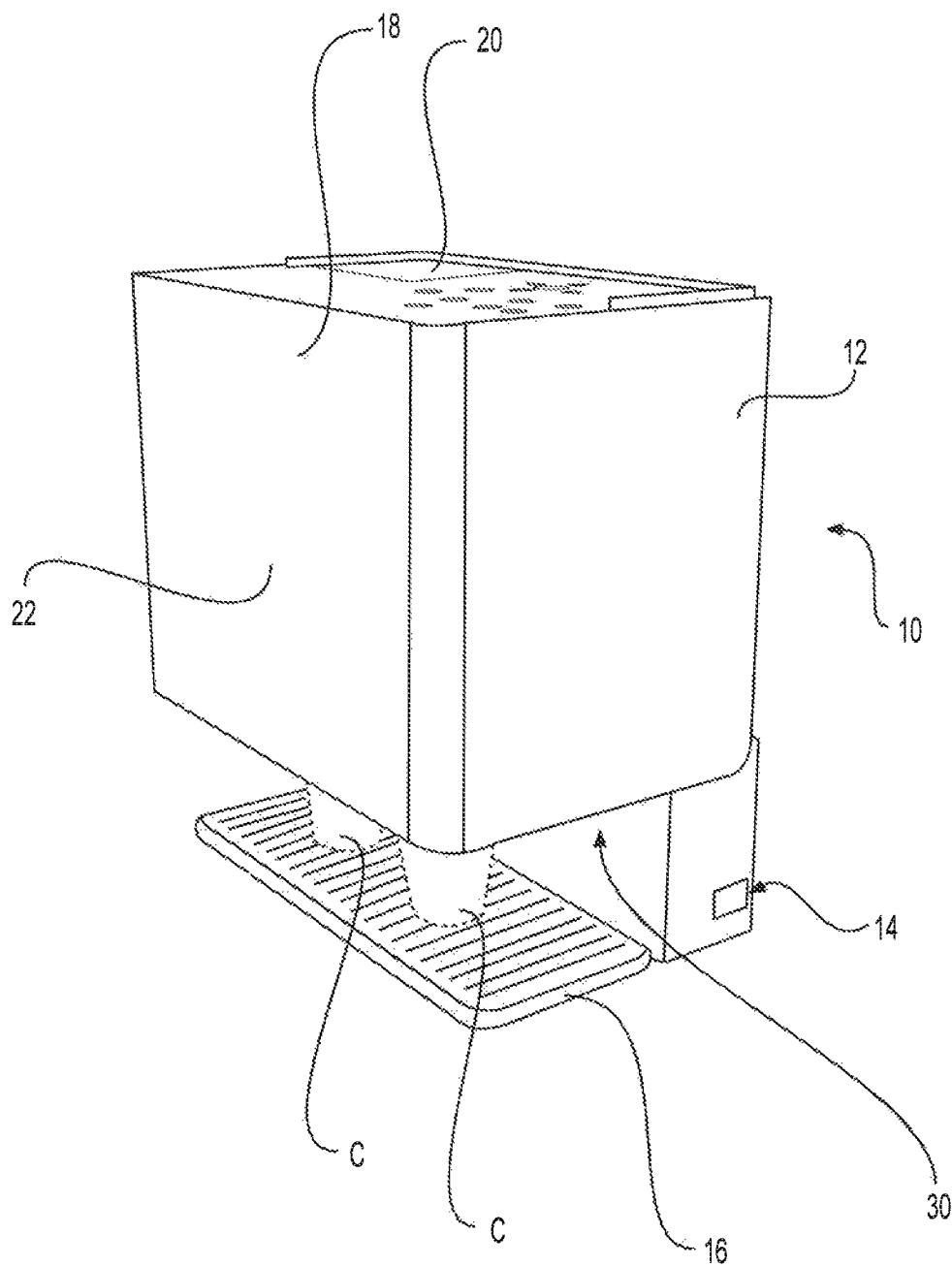
FIG. 1 is a front perspective view of a beverage mixing and dispensing system.
Figure 2:
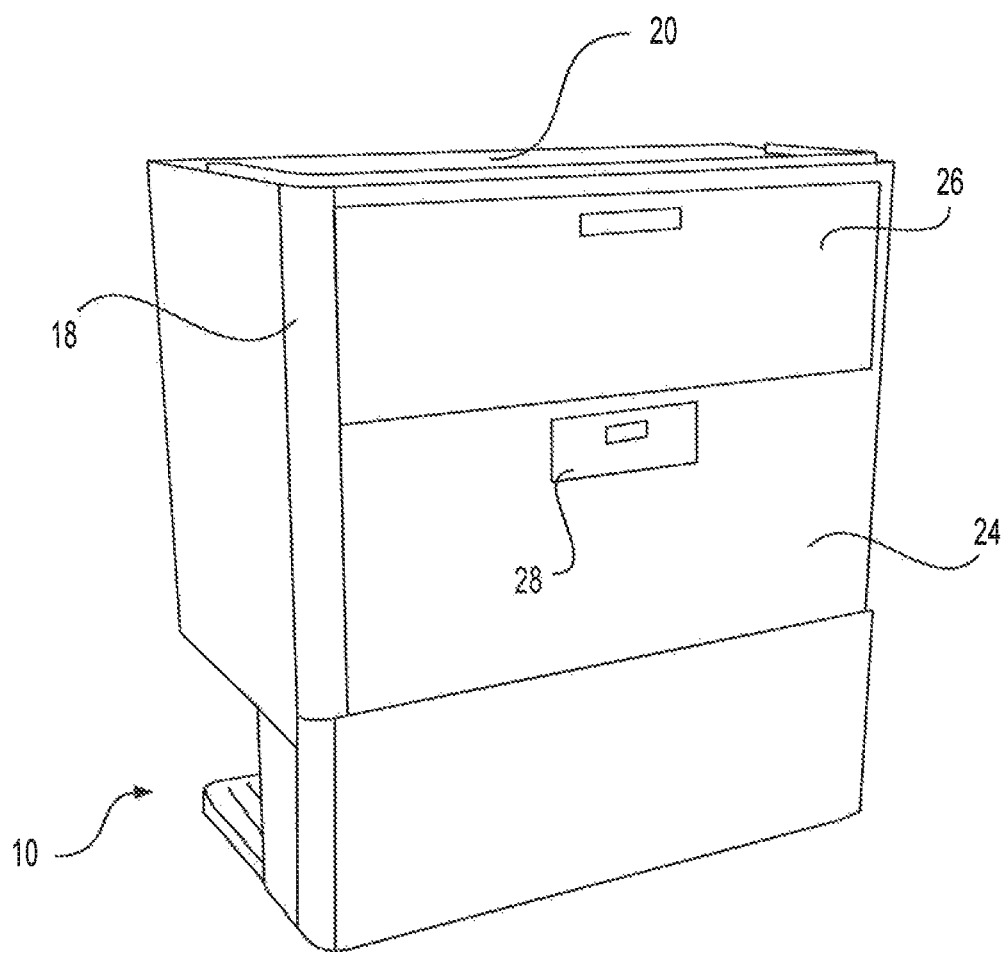
FIG. 2 is a rear perspective view of the beverage mixing and dispensing system.

The beverage mixing and dispensing system 10 is a system for producing beverages having a variety of different consistencies, such as those which may be used in the evaluation and treatment of patients with swallowing disorders. As shown in FIGS. 1 and 2, the beverage mixing and dispensing system 10 includes a housing 12 having a base 16 and a hollow upper portion 18. The base 16 is adapted for receiving at least one beverage receiving container, such as a cup C or the like, and the hollow upper portion 18 includes opposed top and bottom walls 20, 30, respectively, and opposed front and rear walls 22, 24, respectively.

Figure 3:
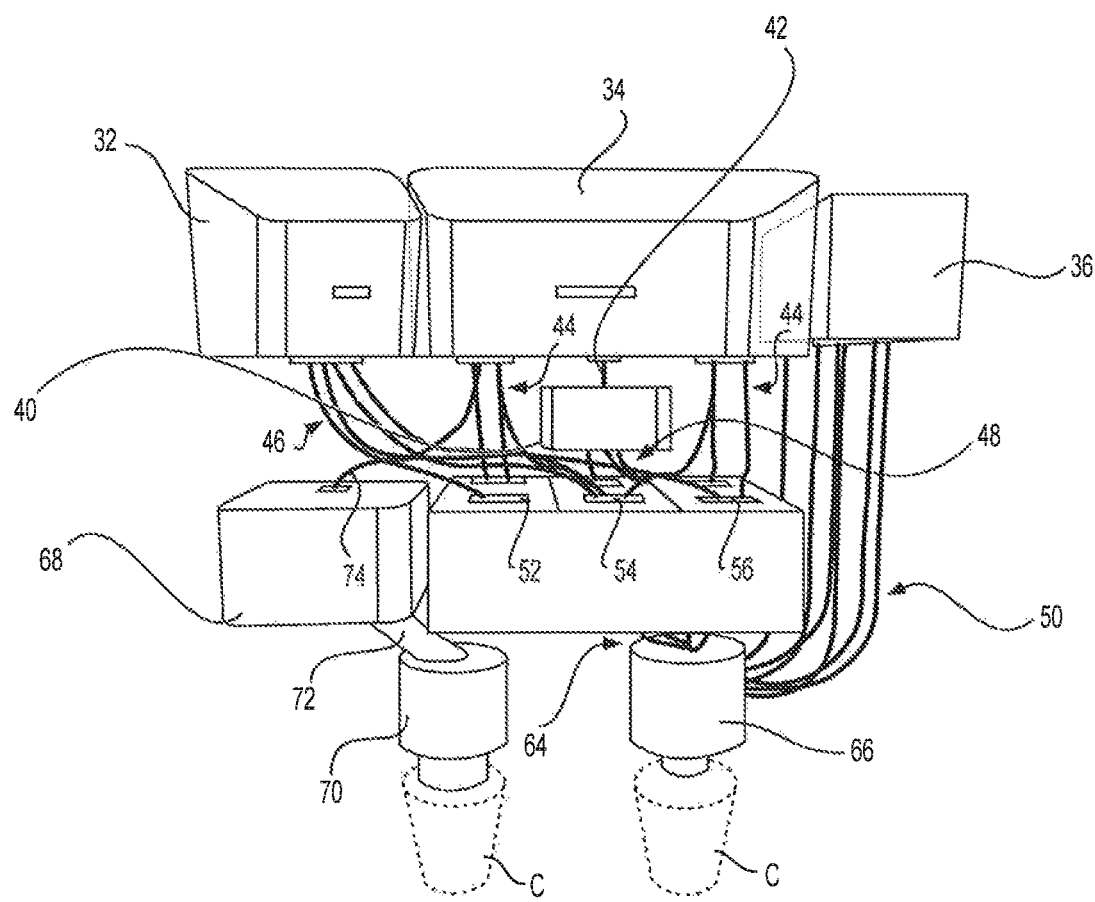
FIG. 3 is a front perspective view of internal components of the beverage mixing and dispensing system.
Figure 4:
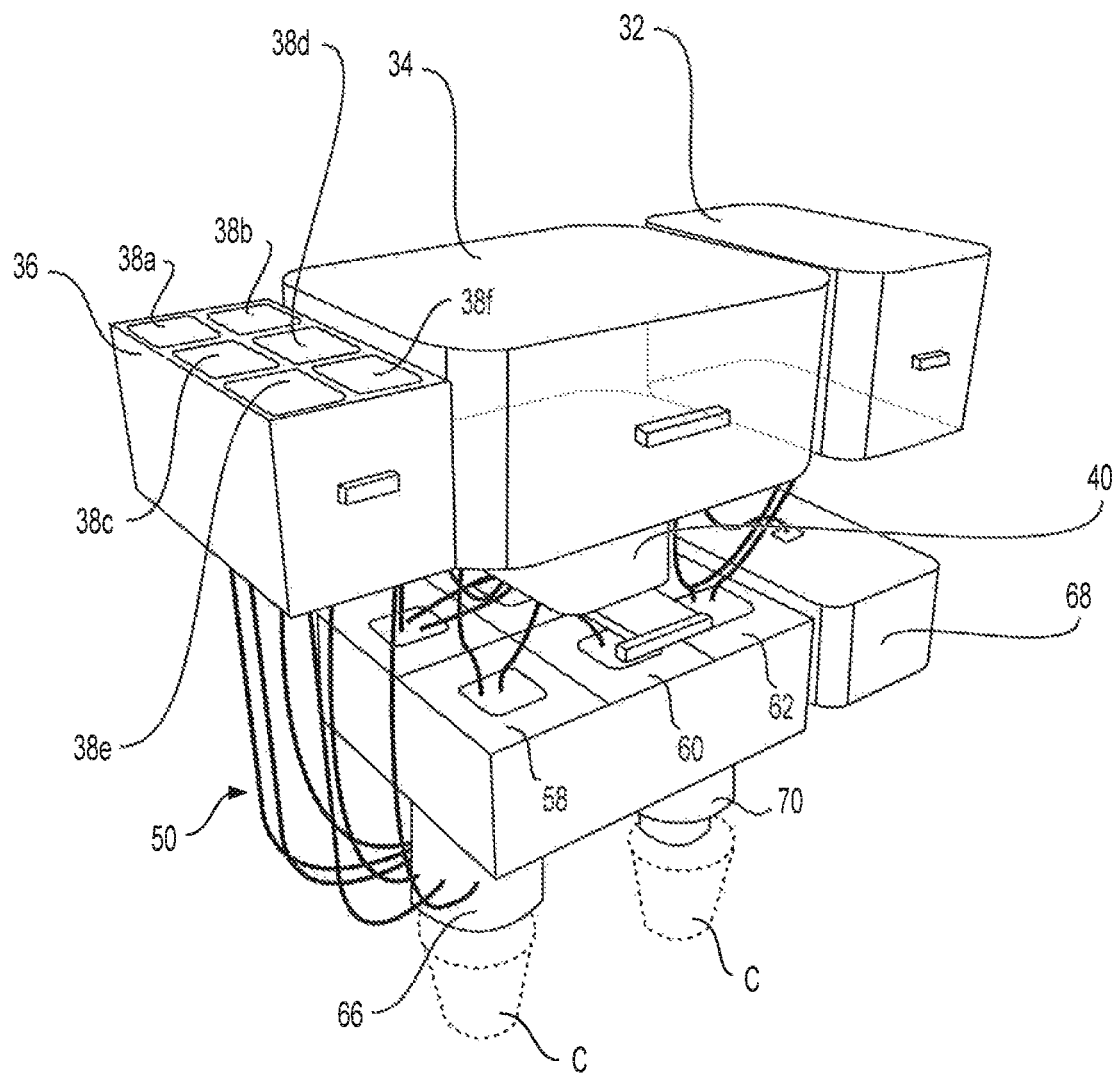
FIG. 4 is a rear perspective view of the internal components of FIG. 3.

As shown in FIGS. 3 and 4, first, second and third receptacles 32, 34, 36, respectively, are mounted within the hollow upper portion 18 of the housing 12. The first receptacle 32 is adapted for receiving a thickening agent, such as pre-gelatinized starch or ThickenUp®, commercial thickener produced by Societe des Produits Nestle of Switzerland. It should be understood that any suitable type of thickening agent may be used. The second receptacle 34 is adapted for receiving water, and the third receptacle 36 is adapted for receiving at least one beverage modifying agent, such as a dye, flavoring agent, medical barium dye or the like. As best seen in FIG. 4, the third receptacle 36 may include a plurality of chambers 38a, 38b, 38c, 38d, 38e, 38f for respectively receiving a plurality of unique beverage modifying agents. It should be understood that the six chambers 38a, 38b, 38c, 38d, 38e, 38f are shown for exemplary purposes only, and any desired number of chambers may be included. Further, it should be understood that the overall shape and relative dimensions of first, second and third receptacles 32, 34, 36, respectively, are shown for exemplary purposes only.

An infusion chamber 40 is provided for receiving a beverage making agent, such as those provided in commercial beverage pods or capsules, to be infused with a portion of the water from the second receptacle 34 to form an infusion. A plurality of receiving chambers 52, 54, 56, 60, 62 receive a portion of the thickening agent from the first receptacle 32 and a liquid, where the liquid is user selectable between a portion of the water from the second receptacle 34 and a portion of the infusion from the infusion chamber 40. It should be understood that the six receiving chambers 52, 54, 56, 58, 60, 62 are shown for exemplary purposes only, and any desired number of receiving chambers may be included. Further, it should be understood that the overall shape and relative dimensions of each of the receiving chambers and the infusion chamber 40 are shown for exemplary purposes only.

Figure 6:
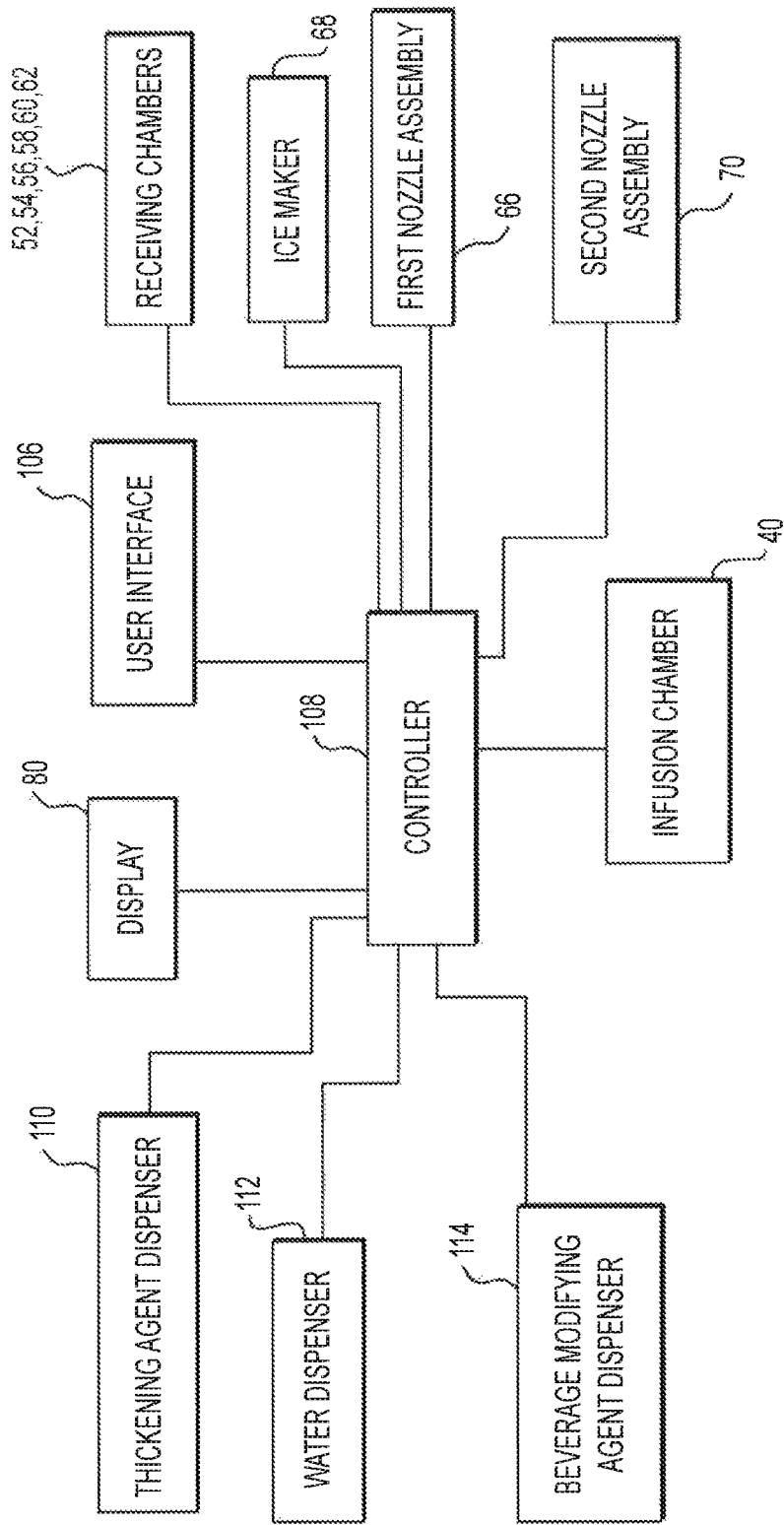
FIG. 6 is a block diagram showing control components of the beverage mixing and dispensing system.

As illustrated in FIG. 6, under the control of a controller 108, one or more thickening agent dispensers 110 within the first receptacle 32 meter out desired quantities of the thickening agent to each of receiving chambers 52, 54, 56, 58, 60, 62 through a set of tubes 46. Similarly, under the control of the controller 108, a water dispenser 112 within the second receptacle 34 meters out desired volumes of water to each of receiving chambers 52, 54, 56, 58, 60, 62 through a set of tubes 44, and also to infusion chamber 40 through tube 42.

It should be understood that the one or more thickening agent dispensers 110 may selectively and controllably meter out the thickening agent in any suitable manner, and that this metering may be based on volumetric measurements or the like, which may be made in any suitable manner known in the art. An exemplary system using optical measurements for volumetric and control and controllable valves for dispensing is shown in the published U.S. patent application US 2020/0002148 A1. A similar metering and dispensing system may be used by water dispenser 112 of second receptacle 34. Further, it should be understood that infusion chamber 40 may be any suitable type of beverage making system known in the art which infuses a pre-packaged or pre-provided beverage making material with water. Such systems typically provide water under pressure to a mixer for producing an infusion, which is then dispensed. An example of such a combined mixer and dispenser for infusions is shown in U.S. Pat. No. 4,488,664. Infusion chamber 40 selectively provides the infusion to receiving chambers 52, 54, 56, 58, 60, 62 through tubes 48, under the control of controller 108.

As shown in FIG. 2, the rear wall 24 of the hollow upper portion 18 may have a first door 26 for providing selective access to the first, second and third receptacles 32, 34, 36, respectively. A second door 28 may also be provided in the rear wall 24 for providing selective access to the infusion chamber 40. As shown in FIG. 1, an additional charging port 14 may also be built into housing 12. It should be understood that the overall configuration, shape and relative dimensions of housing 12, hollow upper portion 18, base 16, first door 26, second door 28 and cups C are shown in FIGS. 1 and 2 for exemplary purposes only.

A first nozzle assembly 66 is in communication with the plurality of receiving chambers 52, 54, 56, 58, 60, 62 (though a set of tubes 64) and the third receptacle 36 (through the set of tubes 50) for receiving the portion of the thickening agent and the liquid from a selected one of the receiving chambers 52, 54, 56, 58, 60, 62, and for further selectively receiving a portion of the at least one beverage modifying agent from the third receptacle 36. Under the control of controller 108, one or more beverage modifying agent dispensers 114, similar to the one or more thickening agent dispensers 110, may meter out desired quantities of beverage modifying agents to be received by the first nozzle assembly 66.

The first nozzle assembly 66 includes both a mixer and a dispenser for mixing the thickening agent, the liquid and, selectively, the at least one beverage modifying agent, producing a mixed beverage having desired properties, including desired thickness and overall consistency. Under the control of controller 108, the first nozzle assembly 66 selectively mixes and dispenses the mixed beverage into the at least one beverage receiving container C. In addition to mixing the mixed beverage, the first nozzle assembly 66 can also heat the mixed beverage to a desired temperature. It should be understood that any suitable type of combined heating, mixing and dispensing unit may be used. An example of such a system, which further includes temperature measurement for feedback-controllable temperature regulation, is shown in U.S. Pat. No. 10,464,026 B2.

An ice maker 68 may also be provided, in communication with the second receptacle 34 (through tube 74), for receiving a portion of the water therefrom to selectively make ice water. A second nozzle assembly 70 receives the ice water (through tube 72) and selectively dispenses the ice water into the at least one beverage receiving container C. Ice maker 68 may also be controlled by controller 108. The second nozzle assembly 70 may also include an ice crusher.

Figure 5:
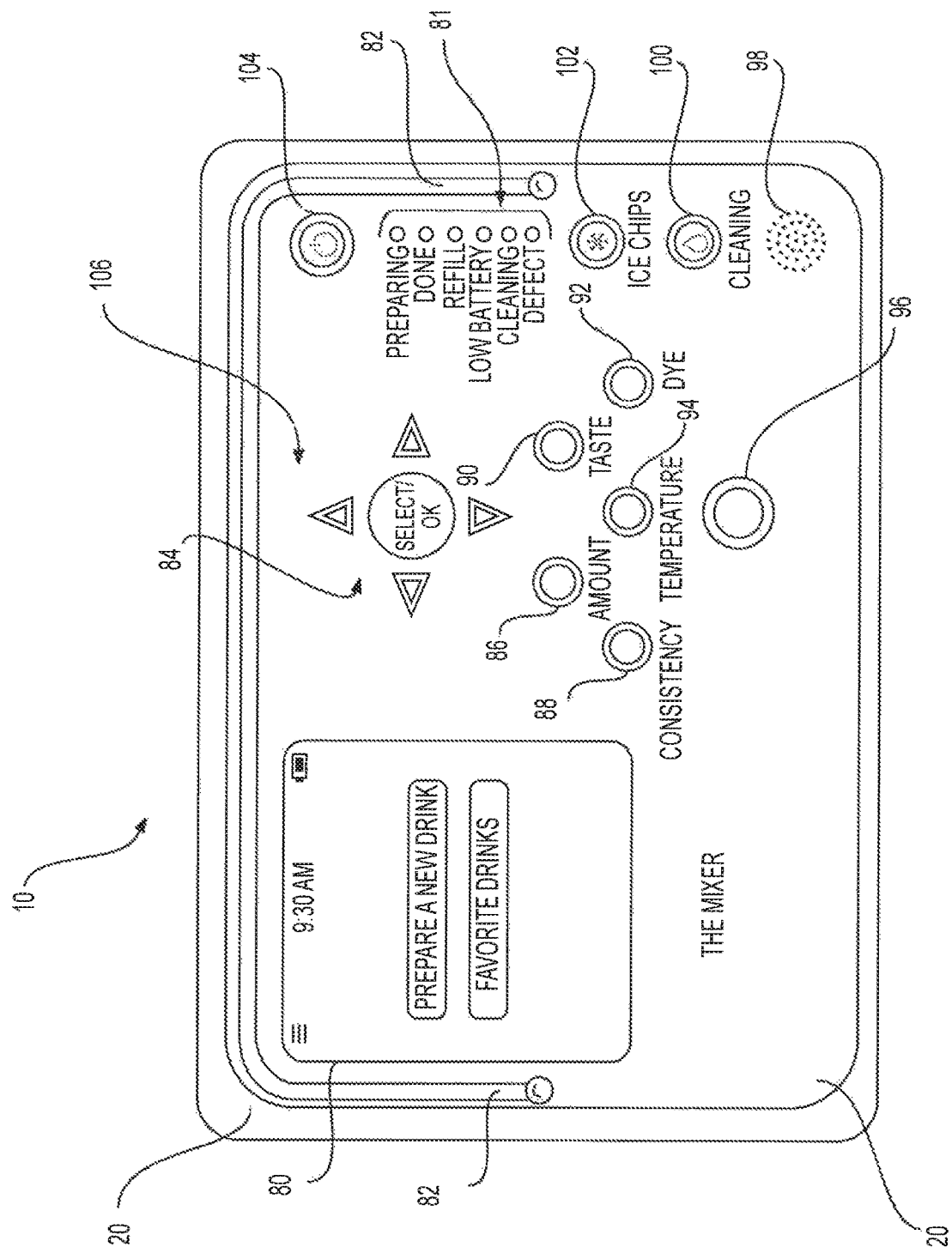
FIG. 5 is a top view of the beverage mixing and dispensing system.

It should be understood that controller 108 may be any suitable type of controller, such as a microprocessor, programmable logic controller or the like, and may be user-operable through any suitable type of interface. In the non-limiting example of FIG. 5, an exemplary user interface 106 and display 80 are shown built into the top wall 20 of upper portion 18 of housing 12. As shown, carrying handles 82 may also be provided, allowing the user to easily transport housing 12 to a desired location. It should be understood that display 80, which may, for example, be a liquid crystal display (LCD) or the like, is shown for exemplary purposes only. It should be further understood that the overall configuration of user interface 106 is shown for exemplary purposes only. In the non-limiting example of FIG. 5, user interface 106 includes a power button 104, control arrows or buttons 84, a button for controlling amounts to be dispensed 86, a button for controlling desired thickness/consistency 88, a button for controlling desired flavor or taste 90, a button for controlling desired color or dye additives 92, a temperature control button 94, a button 96 for starting a mixing and dispensing process, a speaker 98 for providing auditory feedback, a button 100 for initiating an automatic cleaning process, and a button 102 for initiating creation of ice chips. Additionally, as shown, a set of status indicators 81, such as light emitting diodes (LEDs) or the like, may be used to give a quick visual indication of a particular status or mode of operation.

It is to be understood that the beverage mixing and dispensing system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A beverage mixing and dispensing system, comprising:
    a housing having a base and a hollow upper portion, the base being adapted for receiving at least one beverage receiving container, the hollow upper portion having opposed top and bottom walls and opposed front and rear walls;
    first, second and third receptacles mounted within the hollow upper portion of the housing, the first receptacle being adapted for receiving a thickening agent, the second receptacle being adapted for receiving water, and the third receptacle being adapted for receiving at least one beverage modifying agent;
    an infusion chamber for receiving a beverage making agent to be infused with a portion of the water from the second receptacle to form an infusion;
    a plurality of receiving chambers each adapted for receiving a portion of the thickening agent from the first receptacle and a liquid, the liquid being user selectable from a portion of the water from the second receptacle and a portion of the infusion from the infusion chamber; and
    a first nozzle assembly in communication with the plurality of receiving chambers and the third receptacle for receiving the portion of the thickening agent and the liquid from a selected one of the receiving chambers, and for further selectively receiving a portion of the at least one beverage modifying agent from the third receptacle, the first nozzle assembly comprising a mixer and a dispenser for selectively dispensing a mixed beverage into the at least one beverage receiving container.

2. The beverage mixing and dispensing system as recited in claim 1, wherein the at least one beverage modifying agent comprises a plurality of unique beverage modifying agents, the third receptacle having a plurality of chambers each adapted for receiving a respective one of the unique beverage modifying agents.

3. The beverage mixing and dispensing system as recited in claim 1, wherein the rear wall of the hollow upper portion has a first door for providing selective access to the first, second and third receptacles.

4. The beverage mixing and dispensing system as recited in claim 3, wherein the rear wall of the hollow upper portion has a second door for providing selective access to the infusion chamber.

5. The beverage mixing and dispensing system as recited in claim 1, further comprising an ice maker in communication with the second receptacle for receiving a portion of the water therefrom to selectively make ice water.

6. The beverage mixing and dispensing system as recited in claim 5, further comprising a second nozzle assembly for receiving the ice water and selectively dispensing the ice water into the at least one beverage receiving container.

7. The beverage mixing and dispensing system as recited in claim 1, further comprising a controller configured to selectively initiate release of the thickening agent in selected amounts to the plurality of receiving chambers.

8. The beverage mixing and dispensing system as recited in claim 7, wherein the controller is further configured to selectively initiate release of the water from the second receptacle in selected amounts to the infusion chamber and the plurality of receiving chambers.

9. The beverage mixing and dispensing system as recited in claim 8, wherein the controller is further configured to selectively initiate release of the at least one beverage modifying agent from the third receptacle in selected amounts to the first nozzle assembly.

10. The beverage mixing and dispensing system as recited in claim 9, further comprising a display mounted on the housing and in communication with the controller.

11. The beverage mixing and dispensing system as recited in claim 10, further comprising a user interface mounted on the housing and in communication with the controller.

12. A beverage mixing and dispensing system, comprising:
    a housing having a base and a hollow upper portion, the base being adapted for receiving at least one beverage receiving container, the hollow upper portion having opposed top and bottom walls and opposed front and rear walls;
    first, second and third receptacles mounted within the hollow upper portion of the housing, the first receptacle being adapted for receiving a thickening agent, the second receptacle being adapted for receiving water, and the third receptacle being adapted for receiving at least one beverage modifying agent;
    an infusion chamber for receiving a beverage making agent to be infused with a portion of the water from the second receptacle to form an infusion;
    a plurality of receiving chambers each adapted for receiving a portion of the thickening agent from the first receptacle and a liquid, the liquid being user selectable from a portion of the water from the second receptacle and a portion of the infusion from the infusion chamber;
    a first nozzle assembly in communication with the plurality of receiving chambers and the third receptacle for receiving the portion of the thickening agent and the liquid from a selected one of the receiving chambers, and for further selectively receiving a portion of the at least one beverage modifying agent from the third receptacle, the first nozzle assembly comprising a mixer and a dispenser for selectively dispensing a mixed beverage into the at least one beverage receiving container;
    a controller configured to selectively initiate release of the contents of the first receptacle, the second receptacle, the third receptacle, the infusion chamber, and the plurality of receiving chambers; and
    a display mounted on the housing and in communication with the controller.

13. The beverage mixing and dispensing system as recited in claim 12, further comprising a user interface mounted on the housing and in communication with the controller.

14. The beverage mixing and dispensing system as recited in claim 12, wherein the at least one beverage modifying agent comprises a plurality of unique beverage modifying agents, the third receptacle having a plurality of chambers each adapted for receiving a respective one of the unique beverage modifying agents.

15. The beverage mixing and dispensing system as recited in claim 12, wherein the rear wall of the hollow upper portion has a first door for providing selective access to the first, second and third receptacles and a second door for providing selective access to the infusion chamber.

* * * * *